(12) United States Patent
Srinivasan et al.

(10) Patent No.: US 12,468,894 B2
(45) Date of Patent: Nov. 11, 2025

(54) USING LANGUAGE MODEL TO GENERATE RECIPE WITH REFINED CONTENT

(71) Applicant: Maplebear Inc., San Francisco, CA (US)

(72) Inventors: Prithvishankar Srinivasan, Seattle, WA (US); Saurav Manchanda, Seattle, WA (US); Shih-Ting Lin, Santa Clara, CA (US); Shishir Kumar Prasad, Fremont, CA (US); Riddhima Sejpal, Dublin, CA (US); Luis Manrique, New York, NY (US); Min Xie, Santa Clara, CA (US)

(73) Assignee: Maplebear Inc., San Francisco, CA (US)

( * ) Notice: Subject to any disclaimer, the term of this patent is extended or adjusted under 35 U.S.C. 154(b) by 164 days.

(21) Appl. No.: 18/244,098

(22) Filed: Sep. 8, 2023

(65) Prior Publication Data

US 2025/0086395 A1 Mar. 13, 2025

(51) Int. Cl.
*G06F 40/30* (2020.01)

(52) U.S. Cl.
CPC .................. *G06F 40/30* (2020.01)

(58) Field of Classification Search
CPC ..................................................... G06F 40/30
See application file for complete search history.

(56) References Cited

U.S. PATENT DOCUMENTS

| | | | |
|---|---|---|---|
| 11,238,849 B1 * | 2/2022 | Mimassi | G10L 15/07 |
| 11,947,902 B1 * | 4/2024 | Grimshaw | G06F 40/56 |
| 11,995,414 B1 * | 5/2024 | Vlad | G06F 40/51 |
| 12,140,915 B1 * | 11/2024 | McCarson | G06F 18/217 |
| 2020/0151081 A1 * | 5/2020 | Harer | G06F 11/3604 |
| 2023/0259705 A1 * | 8/2023 | Tunstall-Pedoe | G06N 3/0499 704/9 |
| 2024/0202464 A1 * | 6/2024 | Poirier | G06F 40/20 |
| 2024/0256762 A1 * | 8/2024 | Beauchamp | G06F 40/166 |
| 2024/0281619 A1 * | 8/2024 | Koneru | G06F 40/35 |
| 2024/0296425 A1 * | 9/2024 | Rosenkranz | G06F 40/197 |
| 2024/0378395 A1 * | 11/2024 | Sommers | H04L 41/08 |
| 2024/0386185 A1 * | 11/2024 | Munoz | G06F 40/103 |
| 2024/0403634 A1 * | 12/2024 | Hawes | G06N 3/08 |
| 2024/0419917 A1 * | 12/2024 | Clement | G06N 3/045 |
| 2024/0419977 A1 * | 12/2024 | Perez | G06N 3/09 |
| 2025/0005293 A1 * | 1/2025 | Nguyen | G06F 40/30 |
| 2025/0036673 A1 * | 1/2025 | Weber | G06N 3/044 |

(Continued)

*Primary Examiner* — Eric Yen
(74) *Attorney, Agent, or Firm* — Fenwick & West LLP

(57) ABSTRACT

Embodiments relate to utilizing a language model to automatically generate a novel recipe with refined content, which can be offered to a user of an online system. The online system generates a first prompt for input into a large language model (LLM), the first prompt including a plurality of task requests for generating initial content of a recipe. The online system requests the LLM to generate, based on the first prompt input into the LLM, the initial content of the recipe. The online system generates a second prompt for input into the LLM, the second prompt including the initial content of the recipe and contextual information about the recipe. The online system requests the LLM to generate, based on the second prompt input into the LLM, refined content of the recipe. The online system stores the recipe with the refined content in a database of the online system.

20 Claims, 5 Drawing Sheets

(56) References Cited

U.S. PATENT DOCUMENTS

| | | | |
|---|---|---|---|
| 2025/0077238 A1* | 3/2025 | Obando Chacon | G06F 40/284 |
| 2025/0077559 A1* | 3/2025 | Karri | G06T 11/206 |
| 2025/0078334 A1* | 3/2025 | Farris | G06V 20/20 |
| 2025/0086403 A1* | 3/2025 | Pitkin | G06Q 30/0243 |
| 2025/0103824 A1* | 3/2025 | Tan | G06F 3/0482 |
| 2025/0173524 A1* | 5/2025 | Vlad | G06F 40/56 |

* cited by examiner

US 12,468,894 B2

USING LANGUAGE MODEL TO GENERATE RECIPE WITH REFINED CONTENT

BACKGROUND

Writing recipes from scratch traditionally requires significant time and effort. Hence, to provide a wide range of recipe options to its customers, online systems, such as online concierge systems, typically license a catalog of recipes from various providers. However, with the advancement of language models, it is now possible to generate recipes on the fly. Nevertheless, these automatically generated recipes often lack the appeal of human-written recipes, as these recipes are generated without context or validation, and they do not provide accurate tips and necessary information for successful execution. This leads to a technical problem of how to generate recipes with high-quality content at a large scale that is required by an online concierge system.

SUMMARY

Embodiments of the present disclosure are directed to utilizing a language model to automatically generate a novel recipe with refined (e.g., high-quality) content, which can be offered for sale to a user of an online concierge system.

In accordance with one or more aspects of the disclosure, the online concierge system generates a first prompt for input into a large language model (LLM), the first prompt including a plurality of task requests for generating initial content of a recipe. The online concierge system requests the LLM to generate, based on the first prompt input into the LLM, the initial content of the recipe. The online concierge system generates a second prompt for input into the LLM, the second prompt including the initial content of the recipe and contextual information about the recipe. The online concierge system requests the LLM to generate, based on the second prompt input into the LLM, refined content of the recipe. The online concierge system stores the recipe with the refined content in a database of the online concierge system. The online concierge system causes a device of a user of the online concierge system to display a user interface with the refined content of the stored recipe for inclusion into a cart of the user.

DETAILED DESCRIPTION

Figure 1A:
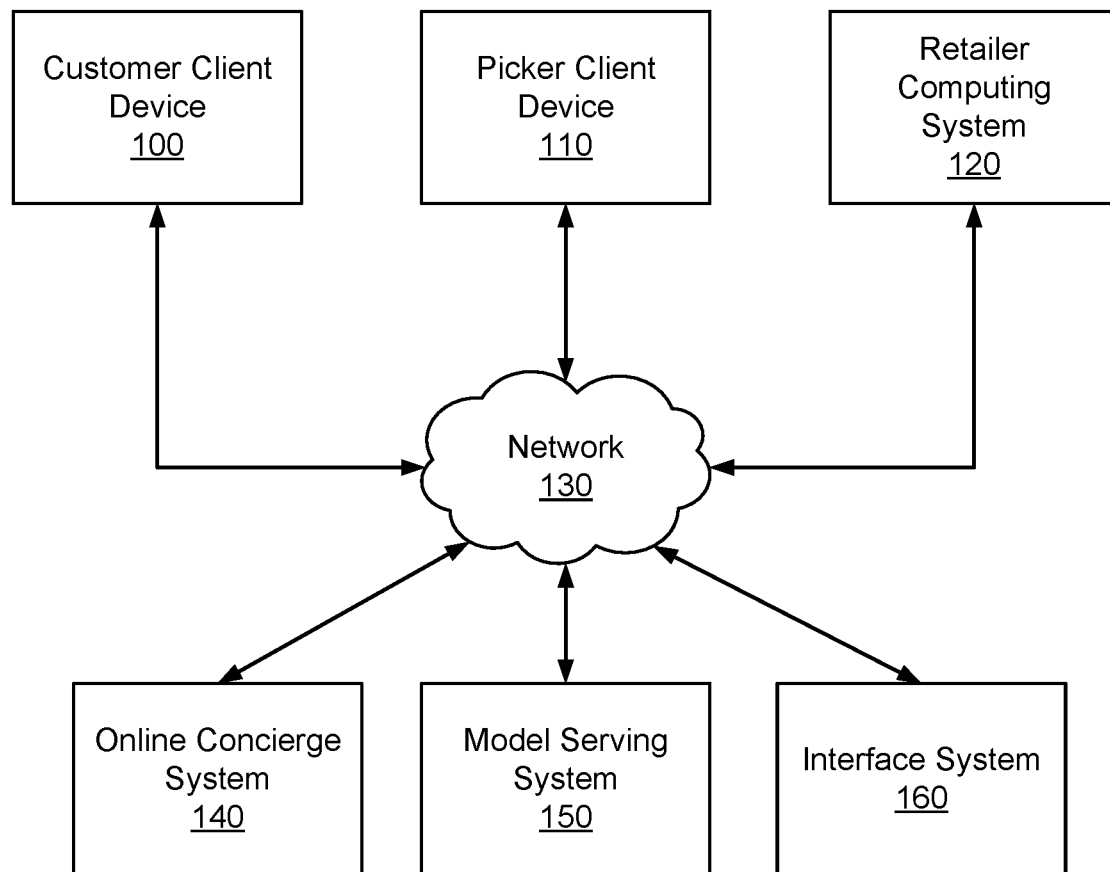
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1A, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In accordance with one or more embodiments, the online concierge system 140 generates recipes with refined content using the LLM. The automatic approach presented herein involves utilizing the LLM to generate refined recipes, wherein each generated recipe may be augmented by supplying the LLM with contextual information (e.g., one or more existing recipes) as a reference. The automatic approach presented herein solves the problem of lacking accuracy and appeal in automatically generated recipes. By utilizing the presented method, the online concierge system 140 can add refined (i.e., high quality) recipes to its catalog. In a first pass, the online concierge system 140 may prompt the LLM to generate a novel recipe without context (e.g., a list of ingredients and cooking steps). In a second pass, the online concierge system 140 may prompt the LLM to generate a full and refined recipe with a specific context, including a descriptive title and one or more paragraphs with interesting details about the recipe, such as a genre or diet related to the recipe or one or more ingredients in the recipe, cooking technique, or cooking equipment featured in the recipe. Hence, the online concierge system 140 may utilize the LLM to generate an initial version of a novel recipe, and then the online concierge system 140 may utilize a feedback mechanism to again prompt the LLM to refine the recipe.

The online concierge system 140 may prepare (e.g., via a prompt generation module 250 in FIG. 2) a first prompt for input to the LLM of the model serving system 150. The first prompt may include one or more task requests for the LLM to generate a novel recipe without context. An example first prompt for input to the LLM of the model serving system 150 may include the following transcript with multiple task requests for the LLM (e.g., 16 task requests, each task request related to a respective content section of the recipe).

Build me a recipe for 15-bean soup. Include 16 content sections: (1) a three to five sentence description of the dish at the top, (2) a meta title, (3) a meta description, (4) all ingredients, (5) steps for the recipe, (6) total estimated calories for this recipe, (7) cook time, (8) servings, (9) nutritional information, (10) a list of required appliances and kitchen equipment for preparing the dish, (11) a "pro-tip" to elevate the dish, (12) frequently asked questions about this recipe or ingredients of the recipe, (13) recommendations for altering the recipe based on a person's preference, such as reducing fat content, substituting ingredients that contain gluten, making the quantity larger or smaller, or recommendations for a specific type of product to use, (14) two sentences of historical context about the recipe, (15) a one sentence description of the skill level required to make the recipe, (16) cuisine of the recipe.

The online concierge system 140 may receive a first response to the first prompt from the model serving system 150 based on execution of the machine-learned model using the first prompt. The first response may include initial content of the recipe (i.e., the recipe without context) with the requested sections of the recipe. The online concierge system 140 may import the first response from the model serving system 150 and use the first response for generating a second prompt for input to the LLM of the model serving system 150. In one or more embodiments, the online concierge system 140 skips the first pass of the LLM and, instead, the online concierge system 140 obtains a recipe without context from another source, such as an online database.

Upon importing the first response from the model serving system 150, the online concierge system 140 may prepare (e.g., via the prompt generation module 250) a second prompt for input to the LLM of the model serving system 150. The second prompt may include the first response imported from the model serving system 150 (i.e., the initial content of the recipe without context), as well as additional contextual information about the recipe representing a guidance for generating the recipe with refined content. The contextual information may include at least one of: (1) information about a diet associated with the recipe (e.g., nonfat, vegan, etc.); (2) information about a genre of the recipe (e.g., Italian, Southern, etc.); (3) information about one or more ingredients of the recipe; (4) technique used for preparing a meal associated with the recipe (e.g., sous vide, etc.); (5) equipment used in the recipe, etc.

In one or more embodiments, the online concierge system 140 generates the second prompt for input to the LLM by further including in the second prompt one or more existing recipes (e.g., retrieved from a catalog of sample recipes or obtained from one or more online sources) that serve as a guide for generating a more accurate and appealing content of the recipe (in comparison with the no context generated recipe available from the first response). The online concierge system 140 may rank (e.g., via a ranking module 260 in FIG. 2) a set of existing recipes (e.g., based on a meta title of the initial recipe without context), and include one or more highest ranking recipes in the second prompt. Additionally, or alternatively, the online concierge system 140 supplies the second prompt for input to the LLM with one or more context specific questions (e.g., one or more curated questions related to a particular cuisine and/or ingredient) so that the LLM generates a final version of the recipe that features more authenticity.

An example second prompt for input to the LLM of the model serving system 150 may include the following transcript with a sample recipe (e.g., the highest ranked recipe).

This is a sample recipe of how to write recipes in an enticing way. Now use this as a guide and make the 15-bean soup recipe better <Insert sample recipe here>."

Another example second prompt for input to the LLM of the model serving system 150 may include the following transcript (e.g., with a highest ranked sample recipe and context specific questions).

"This is a sample southern recipe of southern fried chicken. Use this as a writing guide to alter the style of the recipe. Now alter your generated recipe using this as reference to make it better. <Insert chosen ranked recipe here> and answer the following questions related to southern cooking and ingredients: [list of questions for this genre]".

Example questions related to, e.g., southern cooking and ingredients that can be included in the second prompt are:

"How can I incorporate local ingredients or flavors to give this Southern recipe a regional twist? Are there any creative substitutions or additions I can make to elevate the flavors and textures of this traditional Southern dish? What cooking techniques or methods can I experiment with to add a modern flair to this classic Southern recipe while keeping its authentic essence intact? What cooking techniques or methods can I experiment with to add a modern flair to this classic Southern recipe while keeping its authentic essence intact? What are some alternatives to chicken broth?"

The online concierge system 140 may receive a second response to the second prompt from the model serving system 150 based on execution of the machine-learned model using the second prompt. The second response may include refined content of the recipe (i.e., the recipe with context). The online concierge system 140 may import the second response from the model serving system 150 and store the second response (i.e., the refined content of recipe) into a database (e.g., catalog of refined recipes) of the online concierge system 140. The online concierge system 140 may retrieve the stored refined recipe upon reception of a request from a customer of the online concierge system 140 (e.g., sent via the customer client device 100) and display the refined recipe at a user interface of the customer client device 100. The customer may add the refined recipe to its shopping cart. Alternatively, or additionally, the customer may select and add one or more items associated with the refined recipe to its shopping cart.

In some embodiments, the online concierge system 140 generates a single prompt for input to the LLM by combining the first prompt with the contextual information about the recipe (including the one or more ranked existing recipes and/or the one or more ranked context specific questions) into the combined prompt. In such cases, the recipe with refined content may be generated in a single pass through the LLM of the model serving system 150.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
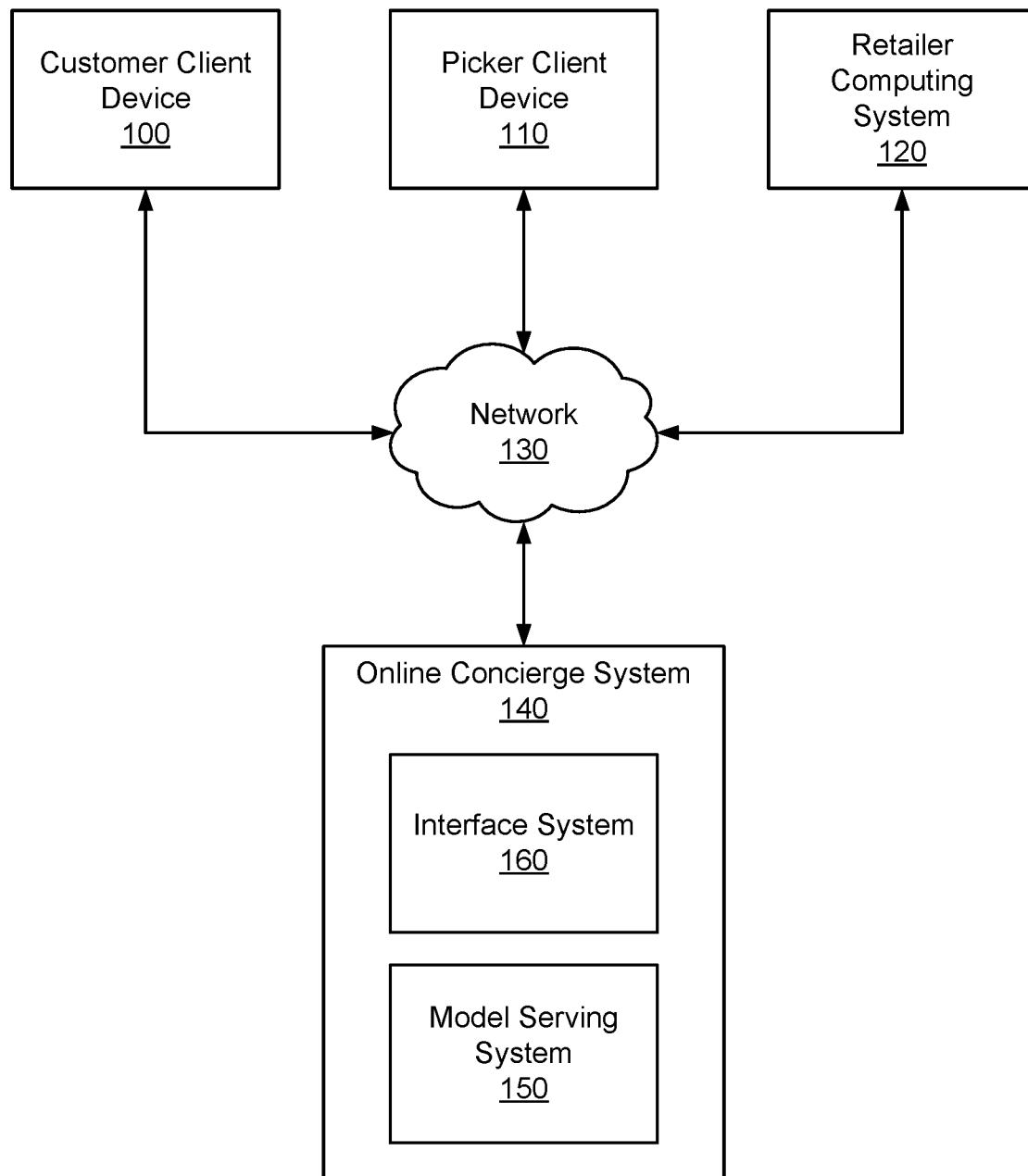
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Figure 2:
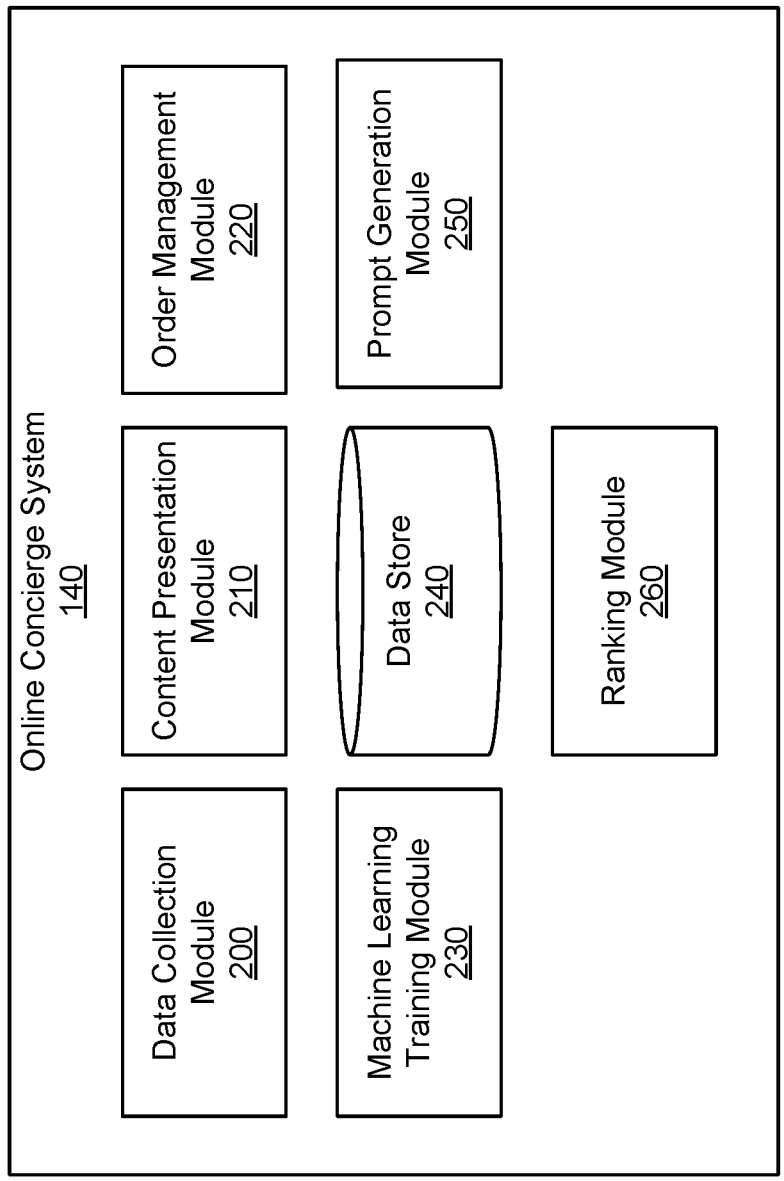
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a prompt generation module 250, and a ranking module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine learning training module 230 may train the item selection model, the availability model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In one or more other embodiments, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The prompt generation module 250 may generate one or more prompts for input into a LLM (e.g., of the model serving system 150). In some embodiments, the prompt generation module 250 generates a first prompt for input into the LLM, the first prompt including multiple task requests for generating initial content of a recipe without context. Upon importing a first response generated by the LLM that includes the initial content of the recipe, the prompt generation module 250 may generate a second prompt for input into the LLM, the second prompt including the initial content of the recipe and contextual information about the recipe. By including the contextual information about the recipe in the second prompt, the online concierge system 140 ensures that the recipe content is not duplicated. The contextual information about the recipe may include at least one of: information about a diet associated with the recipe, information about a genre of the recipe, information about one or more ingredients of the recipe, information about a culinary technique associated with the recipe, information about an equipment used for preparing a meal associated with the recipe, one or more sample recipes from a database of the online concierge system 140 (e.g., the data store 240), or one or more contextual questions about the recipe (e.g., a curated list of questions per ingredient and/or recipe stored at the data store 240). In some other embodiments, the prompt generation module 250 generates a single prompt from input to the LLM by combining, in the single prompt, the multiple task requests for generating the initial content of the recipe and the contextual information about the recipe.

For a given initial content of the recipe obtained from the LLM in response to the first prompt input to the LLM, the ranking module 260 may select one or more sample (or context) recipes (e.g., from a catalog of sample recipes at the data store 240) and one or more contextual questions about a recipe (e.g., from a pool of curated contextual questions stored at the data store 240). The prompt generation module 250 may utilize the one or more selected sample recipes and the one or more contextual questions to generate the second prompt for input to the LLM. The online concierge system 140 utilizes the one or more sample recipes and one or more custom generated questions to augment the style and content of the initial recipe generated by the LLM. The sample recipes and custom generated questions may be used as part of the second prompt input to the LLM as a recipe writing guide. Hence, the prompt generation module 250 may generate the second prompt for input to the LLM algorithmically using the one or more context recipes and the one or more contextual questions that are provided by the ranking module 260. And the prompt generation module 250 may request the LLM to refine the initial content of the recipe by providing the one or more sample recipes and the one or more contextual questions to the LLM for guidance.

Note that selection of the appropriate context recipe(s) and the contextual questions for the second prompt for input to the LLM may be pivotal for refinement of the recipe's content as, e.g., different cuisines have different styles of recipe writing to capture the audience attention, and questions for recipe ingredients depend on a cuisine. The sample recipes and curated questions can be ranked (e.g., via the ranking module 260) to provide to the LLM as context only highly engaging (i.e., unique and personalized to the recipe) sample recipes and curated questions. This is because providing the same recipe to the LLM as a writing guide for all recipes may result in similar content and writing styles. Thus, to alter content of recipes, the second prompt for input to the LLM may be generated to provide different context recipes to the LLM for different recipes.

The ranking module 260 may rank sample recipes from the catalog to obtain a rank for each sample recipe, based at least in part on an initial name of a recipe as available from the initial content of the recipe. The ranking module 260 may perform the ranking by finding one or more recipe names in the catalog with the closest semantic names to the initial name of the recipe using, e.g., the vector search algorithm. The ranking module 260 may select one or more sample recipes with ranks above a threshold rank (e.g., with the closest semantic names to the initial name of the recipe) for inclusion into the second prompt. The prompt generation module 250 may then use the selected one or more sample recipes for preparing the second prompt for input to the LLM. In one or more embodiments, the ranking module 260 applies a computer model (e.g., machine-learning computer model that runs a machine-learning algorithm) to rank the sample recipes from the catalog based at least in part on names of the sample recipes and the initial name of the recipe. A set of parameters for the computer model deployed by the ranking module 260 may be stored on one or more non-transitory computer-readable media of the ranking module 260. Alternatively, the set of parameters for the computer model deployed by the ranking module 260 may be stored on one or more non-transitory computer-readable media of the data store 240.

Alternatively or additionally, the ranking module 260 may rank contextual questions from a catalog of curated questions (e.g., as stored at the data store 240) to obtain a rank for each contextual question. The ranking module 260 may perform the ranking of the contextual questions based on interactions from one or more customers where highly engaged questions obtains a higher rank relative to questions with low customer engagement. The ranking module 260 may select one or more contextual questions for inclusion into the second prompt, where each selected contextual question may have a rank above a threshold rank. Alternatively, the ranking module 260 may randomly select one or more contextual questions for inclusion into the second prompt from a curated list of contextual questions per ingredient and recipe (e.g., as stored at a catalog of curated questions at the data store 240). In one or more embodiments, the ranking module 260 applies the computer model to rank the contextual questions based at least in part on interactions from the one or more customers. Note that the information about ingredients and recipe is available to the ranking module 260 from the initial content of the recipe as generated by the LLM. The prompt generation module 250 may then use the selected one or more contextual questions for preparing the second prompt for input to the LLM. In one or more embodiments, one or more ranking algorithms applied by the ranking module 260 for ranking sample recipes and/or contextual questions as well as parameters of the computer model can be refined (or, more generally, updated) based at least in part on interactions that the sample recipes and the contextual questions receive from customers of the online concierge system 140.

The recipe with refined content obtained from the LLM in response to the second prompt input to the LLM may be stored in a catalog of the online concierge system 140 (e.g., at the data store 240). Responsive to a request from a customer of the online concierge system 140, the content presentation module 210 may retrieve the stored recipe with refined content from the catalog and cause a device of the customer (e.g., the customer client device 100) to display a user interface with the refined content of the recipe. The customer can then include the recipe with refined content into a shopping cart. Alternatively or additionally, the customer can use the recipe with refined content to select one or more items associated with the recipe and add the one or more selected items into the shopping cart. In one or more embodiments, feedback from the customer on the presented recipe with refined content (e.g., information about a conversion of each item associated with the recipe) is provided to the model serving system 150 for updating the LLM, as well as to the prompt generation module 250 for updating one or more prompts input into the LLM. Alternatively or additionally, the feedback from the customer on the presented recipe may be provided to the ranking module 260 to refine the one or more ranking algorithms of the ranking module 260, update the one or more contextual questions used by the ranking module 260, and/or update parameters of the computer model applied by the ranking module 260.

Figure 3:
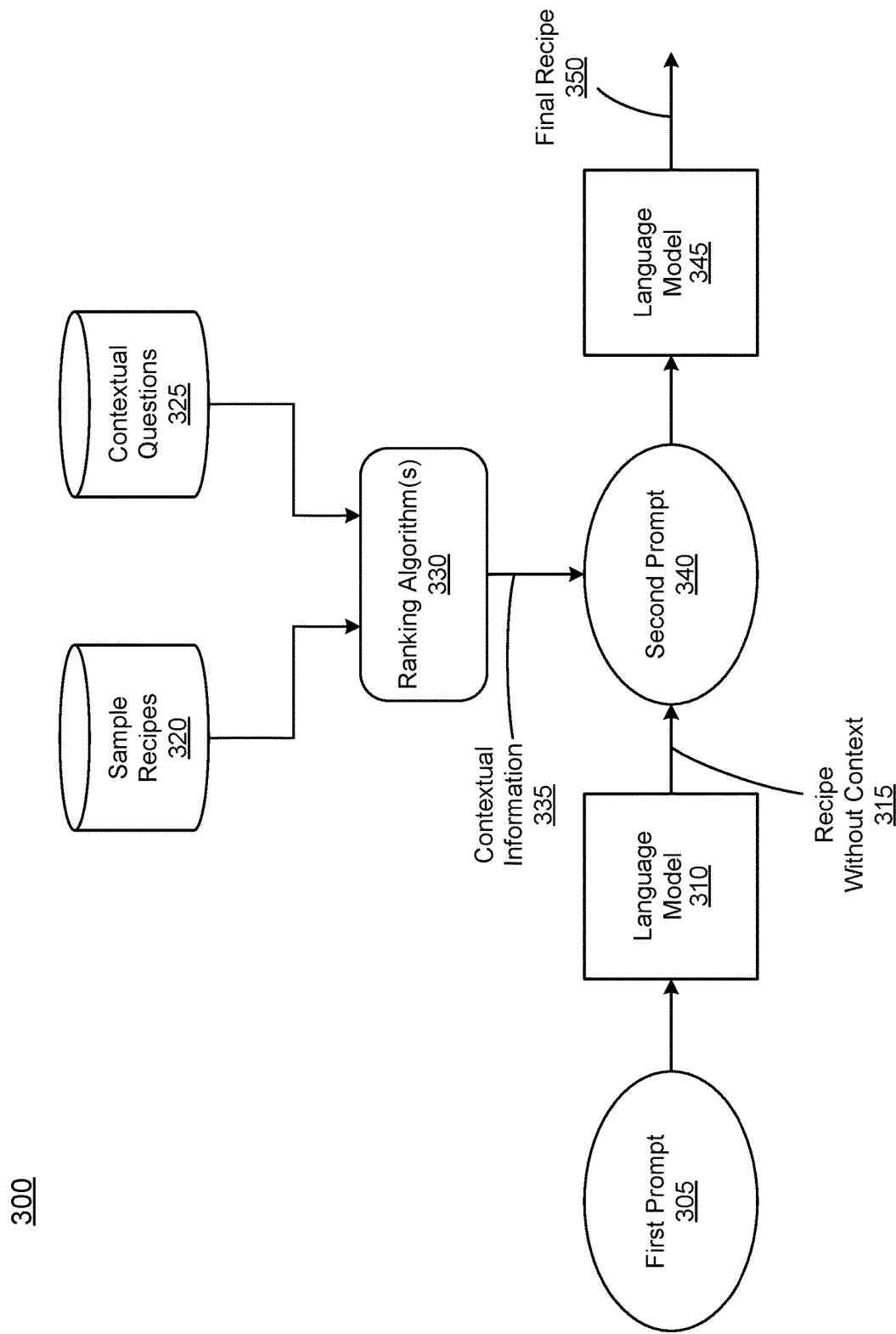
FIG. 3 illustrates an example system flow for utilizing one or more language models for generating a recipe with refined content at an online concierge system, in accordance with one or more embodiments.

FIG. 3 illustrates an example system flow 300 for utilizing one or more language models for generating a recipe with refined content at the online concierge system 140, in accordance with one or more embodiments. The online concierge system 140 may generate (e.g., via the prompt generation module 250) a first prompt 305 for input into a language model 310. The first prompt 305 may include multiple task requests for generating a recipe without context. The language model 310 may be the LLM of the model serving system 150. The language model 310 may generate a recipe without context 315 based on the first prompt 305. The recipe without context 315 may be then imported, e.g., from the model serving system 150 to the online concierge system 140 (e.g., to the prompt generation module 250).

Sample recipes 320 (e.g., context recipes) and contextual questions 325 (e.g., questions related to different ingredients and/or cuisines) may be stored at one or more catalogs of the online concierge system 140 (e.g., at one or more catalogs of the data store 240). The ranking module 260 may retrieve some or all of the stored sample recipes 320 and/or the contextual questions 325 from the one or more catalogs, and the ranking module 260 may run one or more ranking algorithms 330 to rank the sample recipes 320 and/or the contextual questions 325 (e.g., based on information from the recipe without context 315). The ranking module 260 may then select one or more of the ranked sample recipes (e.g., one or more highest ranked sample recipes) and/or one or more of the ranked contextual questions (e.g., one or more highest ranked contextual questions) to be included into contextual information 335.

The online concierge system 140 may generate (e.g., via the prompt generation module 250) a second prompt 340 for input into a language model 345 by including in the second prompt 340 the recipe without context 315 generated by the language model 310 and the contextual information 335 generated by the one or more ranking algorithms 330 run by, e.g., the ranking module 260. The language model 345 may be the LLM of the model serving system 150. In one or more embodiments, the language model 345 and the language model 310 represent the same language model. The language model 345 may generate a final recipe 350 (i.e., recipe with refined content, augmented with the contextual information 335) based on the second prompt 340. The final recipe 350 may be then imported, e.g., from the model serving system 150 to the online concierge system 140 and stored in a catalog of refined recipes (e.g., as part of the data store 240). Upon a request from a customer of the online concierge system 140, the final recipe 350 may be retrieved (e.g., via the content presentation module 210) from the catalog of refined recipes and presented to the customer, e.g., via a user interface at the customer client device 100 for inclusion into a shopping cart.

Figure 4:
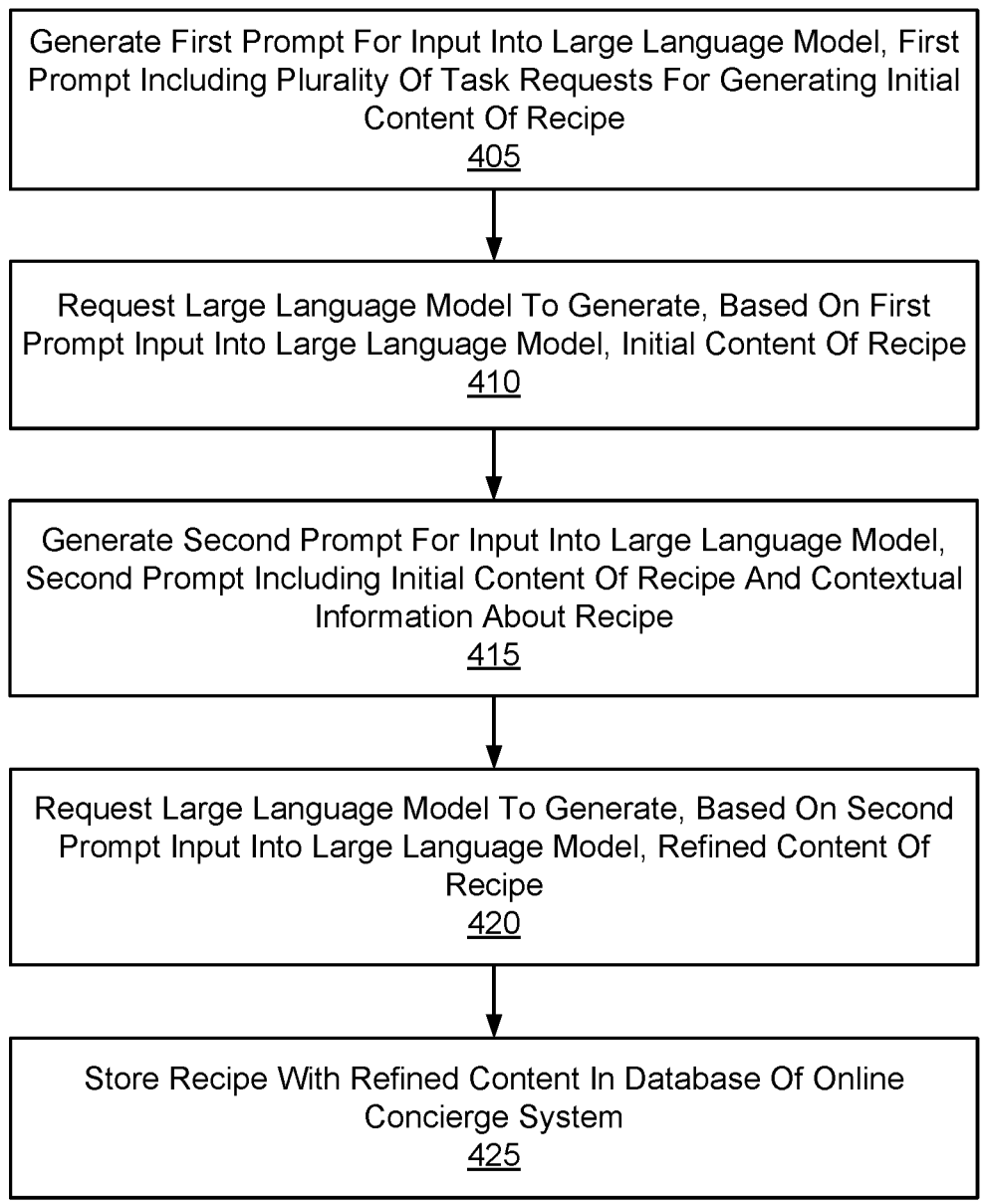
FIG. 4 is a flowchart of a method of using a language model to automatically generate a novel recipe with refined content for an online concierge system, in accordance with one or more embodiments.

FIG. 4 is a flowchart of a method of using a language model to automatically generate a novel recipe with refined content for an online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 generates 405 (e.g., via the prompt generation module 250) a first prompt for input into a LLM (e.g., LLM of the model serving system 150), the first prompt including a plurality of task requests for generating initial content of a recipe. The online concierge system 140 requests 410 (e.g., via the prompt generation module 250) the LLM to generate, based on the first prompt input into the LLM, the initial content of the recipe.

The online concierge system 140 may generate (e.g., via the prompt generation module 250) the first prompt for input into the LLM by including in the first prompt at least one of: a task request for generating a description of a meal associated with the recipe, a task request for generating an initial title of the recipe, a task request for generating a list of ingredients in the recipe, a task request for generating a plurality of culinary steps associated with the recipe, a task request for estimating a total number of calories associated with the recipe, a task request for estimating a time for performing one or more of the plurality of culinary steps, a task request for estimating nutritional information of the recipe, a task request for generating a list of appliances and equipment for preparing the meal, a task request for one or more recommendations for altering the recipe, a task request for generating a historical context of the recipe, a task request for generating information about a skill level requirement to prepare the meal using the recipe, or a task request for generating information about a cuisine associated with the recipe. The online concierge system 140 may receive (e.g., via the prompt generation module 250) a response from the LLM, the response including the initial content of the recipe with a description of the recipe without the contextual information about the recipe.

The online concierge system 140 generates 415 (e.g., via the prompt generation module 250 and the ranking module 260) a second prompt for input into the LLM, the second prompt including the initial content of the recipe and contextual information about the recipe. The online concierge system 140 requests 420 (e.g., via the prompt generation module 250) the LLM to generate, based on the second prompt input into the LLM, refined content of the recipe.

The online concierge system 140 may generate (e.g., via the prompt generation module 250) the second prompt for input into the LLM to include the contextual information with at least one of: information about a diet associated with the recipe, information about a genre of the recipe, information about one or more ingredients of the recipe, information about a culinary technique associated with the recipe, or information about an equipment used for preparing a meal associated with the recipe. The online concierge system 140 may generate (e.g., via the prompt generation module 250) the second prompt for input into the LLM to further include one or more sample recipes from a database of the online concierge system 140 (e.g., the data store 240).

The online concierge system 140 may rank (e.g., via the ranking module 260) a plurality of sample recipes from the database to obtain a rank for each of the plurality of sample recipes, based on at least one of the contextual information about the recipe or an initial name of the recipe from the initial content of the recipe. The online concierge system 140 may select (e.g., via the ranking module 260) a sample recipe of the plurality of sample recipes based at least in part on the rank for each of the plurality of sample recipes. The online concierge system 140 may generate (e.g., via the prompt generation module 250) the second prompt for input into the LLM to further include the selected sample recipe.

The online concierge system 140 may generate (e.g., via the prompt generation module 250 and the ranking module 260) the second prompt for input into the LLM to further include one or more questions for the LLM (e.g., retrieved from the data store 240) that are related to the contextual information about the recipe. The online concierge system 140 may generate (e.g., via the prompt generation module 250 and the ranking module 260) the second prompt for input into the LLM to further include one or more questions for the LLM (e.g., retrieved from the data store 240) related to at least one of a diet associated with the recipe, a genre of the recipe, one or more ingredients of the recipe, or a culinary technique associated with the recipe.

The online concierge system 140 may rank (e.g., via the ranking module 260) a plurality of questions from the database to obtain a rank for each of the plurality of questions, based on at least one of the contextual information about the recipe or one or more interactions by one or more users of the online concierge system. The online concierge system 140 may select (e.g., via the ranking module 260) one or more questions of the plurality of questions based at least in part on the rank for each of the plurality of questions. The online concierge system 140 may generate (e.g., via the prompt generation module 250) the second prompt for input into the LLM to further include the one or more selected questions.

The online concierge system 140 stores 425 the recipe with the refined content in the database (e.g., the data store 240). The online concierge system 140 may cause (e.g., via the content presentation module 210) a device of the user (e.g., the customer client device 100) to display a user interface with the refined content of the stored recipe for inclusion into a cart of the user. The online concierge system 140 may receive (e.g., via the content presentation module 210) feedback from the customer associated with the recipe having the refined content displayed at the user interface. The received feedback may include information about a conversion of each item associated with the recipe by the customer. Based on the received feedback, the online concierge system 140 may initiate update of at least one of one or more parameters of the LLM, the first prompt, the second prompt, the contextual information about the recipe, or one or more parameters of a computer model (e.g., the computer model deployed by the ranking module 260) applied to rank components of the contextual information (e.g., sample recipes and/or contextual questions).

Embodiments of the present disclosure are directed to the online concierge system 140 that utilizes a language model to generate recipes with high-quality content. The language model is prompted to enhance a description for a given recipe with context-dependent guidance for the style and the content to include in the recipe description. The system presented herein prevents the language model from producing irrelevant or nonsensical instructions in recipes or cooking tips, thus mitigating the issue of hallucination. By utilizing existing recipes as a guide, the system presented herein ensures that the generated recipes are more reliable and practical.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   generating a first prompt for a language model, the first prompt including a plurality of task requests for generating initial content for a recipe;
   requesting the language model to generate, based on the first prompt, the initial content for the recipe;
   generating a second prompt for the language model, the second prompt including the initial content for the recipe and contextual information about the recipe;
   requesting the language model to generate, based on the second prompt, refined content for the recipe; and
   storing, in a database of an online system, a version of the recipe having the refined content.

2. The method of claim 1, wherein generating the first prompt for the language model comprises:
   generating the first prompt for the language model by including in the first prompt at least one of: a task request for generating a description of a meal associated with the recipe, a task request for generating an initial title of the recipe, a task request for generating a list of ingredients in the recipe, a task request for generating a plurality of culinary steps associated with the recipe, a task request for estimating a total number of calories associated with the recipe, a task request for estimating a time for performing one or more of the plurality of culinary steps, a task request for estimating nutritional information of the recipe, a task request for generating a list of appliances and equipment for preparing the meal, a task request for one or more recommendations for altering the recipe, a task request for generating a historical context of the recipe, a task request for generating information about a skill level requirement to prepare the meal using the recipe, or a task request for generating information about a cuisine associated with the recipe.

3. The method of claim 1, further comprising:
receiving a response from the language model, the response including the initial content for the recipe with a description of the recipe without the contextual information about the recipe.

4. The method of claim 1, wherein generating the second prompt for the language model comprises:
generating the second prompt for the language model to include the contextual information with at least one of: information about a diet associated with the recipe, information about a genre of the recipe, information about one or more ingredients of the recipe, information about a culinary technique associated with the recipe, or information about an equipment used for preparing a meal associated with the recipe.

5. The method of claim 1, wherein generating the second prompt for the language model comprises:
generating the second prompt for the language model to further include one or more sample recipes from the database.

6. The method of claim 1, wherein generating the second prompt for the language model comprises:
ranking, based on at least one of the contextual information about the recipe or an initial name of the recipe from the initial content for the recipe, a plurality of sample recipes from the database to obtain a rank for each of the plurality of sample recipes;
selecting, based at least in part on the rank for each of the plurality of sample recipes, a sample recipe of the plurality of sample recipes; and
generating the second prompt for the language model to further include the selected sample recipe.

7. The method of claim 1, wherein generating the second prompt for the language model comprises:
generating the second prompt for the language model to further include one or more questions for the language model that are related to the contextual information about the recipe.

8. The method of claim 1, wherein generating the second prompt for the language model comprises:
generating the second prompt for the language model to further include one or more questions for the language model related to at least one of a diet associated with the recipe, a genre of the recipe, one or more ingredients of the recipe, or a culinary technique associated with the recipe.

9. The method of claim 1, wherein generating the second prompt for the language model comprises:
ranking, based on at least one of the contextual information about the recipe or one or more interactions by one or more users of the online system, a plurality of questions from the database to obtain a rank for each of the plurality of questions;
selecting, based at least in part on the rank for each of the plurality of questions, one or more questions of the plurality of questions; and
generating the second prompt for the language model to further include the one or more selected questions.

10. The method of claim 1, further comprising:
causing a device associated with a user of the online system to display a user interface with the refined content of the stored version of the recipe for inclusion into a cart of the user.

11. The method of claim 10, further comprising:
receiving, via a network and from the device associated with the user, feedback in relation to the refined content displayed at the user interface; and
initiating, based on the received feedback, update of at least one of one or more parameters of the language model, the first prompt, the second prompt, the contextual information about the recipe, or one or more parameters of a machine-learning model applied to rank components of the contextual information.

12. A computer program product comprising a non-transitory computer readable storage medium having instructions encoded thereon that, when executed by a processor, cause the processor to perform steps comprising:
generating a first prompt for a language model, the first prompt including a plurality of task requests for generating initial content for a recipe;
requesting the language model to generate, based on the first prompt, the initial content for the recipe;
generating a second prompt for the language model, the second prompt including the initial content for the recipe and contextual information about the recipe;
requesting the language model to generate, based on the second prompt, refined content for the recipe; and
storing, in a database of an online system, a version of the recipe having the refined content.

13. The computer program product of claim 12, wherein generating the first prompt for the language model comprises:
generating the first prompt for the language model by including in the first prompt at least one of: a task request for generating a description of a meal associated with the recipe, a task request for generating an initial title of the recipe, a task request for generating a list of ingredients in the recipe, a task request for generating a plurality of culinary steps associated with the recipe, a task request for estimating a total number of calories associated with the recipe, a task request for estimating a time for performing one or more of the plurality of culinary steps, a task request for estimating nutritional information of the recipe, a task request for generating a list of appliances and equipment for preparing the meal, a task request for one or more recommendations for altering the recipe, a task request for generating a historical context of the recipe, a task request for generating information about a skill level requirement to prepare the meal using the recipe, or a task request for generating information about a cuisine associated with the recipe.

14. The computer program product of claim 12, wherein generating the second prompt for the language model comprises:
generating the second prompt for the language model to include the contextual information with at least one of: information about a diet associated with the recipe, information about a genre of the recipe, information about one or more ingredients of the recipe, information about a culinary technique associated with the recipe, or information about an equipment used for preparing a meal associated with the recipe.

15. The computer program product of claim 12, wherein generating the second prompt for the language model comprises:
generating the second prompt for the language model to further include one or more sample recipes from the database.

16. The computer program product of claim 12, wherein generating the second prompt for the language model comprises:
ranking, based on at least one of the contextual information about the recipe or an initial name of the recipe from the initial content for the recipe, a plurality of sample recipes from the database to obtain a rank for each of the plurality of sample recipes;

selecting, based at least in part on the rank for each of the plurality of sample recipes, a sample recipe of the plurality of sample recipes; and generating the second prompt for the language model to further include the selected sample recipe.

17. The computer program product of claim 12, wherein generating the second prompt for the language model comprises:

generating the second prompt for the language model to further include one or more questions for the language model that are related to the contextual information about the recipe.

18. The computer program product of claim 12, wherein generating the second prompt for the language model comprises:

ranking, based on at least one of the contextual information about the recipe or one or more interactions by one or more users of the online system, a plurality of questions from the database to obtain a rank for each of the plurality of questions;

selecting, based at least in part on the rank for each of the plurality of questions, one or more questions of the plurality of questions; and generating the second prompt for the language model to further include the one or more selected questions.

19. The computer program product of claim 12, wherein the instructions further cause the processor to perform steps comprising:

causing a device associated with a user of the online system to display a user interface with the refined content of the stored version of the recipe for inclusion into a cart of the user.

20. A computer system comprising:

a processor; and a non-transitory computer-readable storage medium having instructions that, when executed by the processor, cause the computer system to perform steps comprising:

generating a first prompt for a language model, the first prompt including a plurality of task requests for generating initial content for a recipe;

requesting the language model to generate, based on the first prompt, the initial content for the recipe;

generating a second prompt for the language model, the second prompt including the initial content for the recipe and contextual information about the recipe;

requesting the language model to generate, based on the second prompt, refined content for the recipe; and storing, in a database of an online system, a version of the recipe having the refined content.

* * * * *